United States Patent
Bonnefoy et al.

(10) Patent No.: US 8,396,467 B2
(45) Date of Patent: Mar. 12, 2013

(54) APPARATUS AND METHOD FOR EVENT DETECTION

(75) Inventors: David Bonnefoy, Gilly sur Isere (FR); Makram Bouzid, Orsay (FR); Nicolas Lhuillier, Versailles (FR); Kevin Mercer, Wantage (GB)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 12/809,650

(22) PCT Filed: Nov. 6, 2008

(86) PCT No.: PCT/US2008/082548
§ 371 (c)(1),
(2), (4) Date: Jun. 21, 2010

(87) PCT Pub. No.: WO2009/085398
PCT Pub. Date: Jul. 9, 2009

(65) Prior Publication Data
US 2010/0273463 A1    Oct. 28, 2010

(30) Foreign Application Priority Data

Dec. 20, 2007 (GB) .................................. 0724854.5

(51) Int. Cl.
*H04M 3/00* (2006.01)
*H04M 3/42* (2006.01)
(52) U.S. Cl. ..................... 455/420; 455/414.1
(58) Field of Classification Search .......... 455/418–420, 455/412.1–412.2, 453, 466, 456.1–456.6, 455/404.1–404.2, 41.2–41.3; 370/328, 338
See application file for complete search history.

(56) References Cited

U.S. PATENT DOCUMENTS
(Continued)

FOREIGN PATENT DOCUMENTS
| CN | 101014120 A | 8/2007 |
| JP | 2002-101369 A | 4/2002 |

(Continued)

OTHER PUBLICATIONS

Chen, et al., "Density-Based Clustering for Real-Time Stream Data," Proceedings of the 13th ACM SIGKDD International Conference on Knowledge Discovery and Data Mining, San Jose, California, USA, 2007, pp. 133-142.

(Continued)

*Primary Examiner* — Brandon Miller
(74) *Attorney, Agent, or Firm* — Stephen H. Shaw

(57) ABSTRACT

An event detection apparatus for a cellular communication system comprises a video upload processor (203) which receives video upload activity indications. Each video upload activity indication comprises an indication of a video upload from a remote station of the cellular communication system as well as a remote station location indication for the remote station from which a video clip is uploaded. An event processor (205) generates an event indication in response to the video upload activity indications meeting a criterion where the event indication comprises an event location indication generated in response to the remote station location indications. The event detection criterion may specifically be that more than a given number of video upload activity indications are indicative of video uploads within a given time interval and geographic area. The invention may allow improved event detection.

10 Claims, 3 Drawing Sheets

U.S. PATENT DOCUMENTS

| | | | |
|---|---|---|---|
| 7,031,714 B1 | 4/2006 | Rayburn | |
| 7,639,943 B1* | 12/2009 | Kalajan | 396/429 |
| 7,929,942 B2* | 4/2011 | Schefczik et al. | 455/404.1 |
| 7,975,062 B2* | 7/2011 | Krikorian et al. | 709/231 |
| 2003/0053608 A1 | 3/2003 | Ohmae et al. | |
| 2003/0100990 A1 | 5/2003 | Clapper | |
| 2003/0184653 A1 | 10/2003 | Ohkubo | |
| 2006/0070105 A1* | 3/2006 | Kawai | 725/86 |
| 2007/0036279 A1* | 2/2007 | Tam et al. | 379/45 |
| 2007/0214180 A1* | 9/2007 | Crawford | 707/104.1 |
| 2008/0176547 A1* | 7/2008 | Paul et al. | 455/418 |
| 2008/0242317 A1* | 10/2008 | Abhyanker | 455/456.3 |

FOREIGN PATENT DOCUMENTS

| | | |
|---|---|---|
| KR | 10-0788605 B1 | 12/2007 |

OTHER PUBLICATIONS

Li, et al, "Detection and Identification of Network Anomalies Using Sketch Subspaces," Proceedings of the 6th ACM SIGCOMM Conference on Internet Measurement, Rio de Janeriro, Brazil, 2006, pp. 147-152.

Richard Howe, Examiner, "GB0724854.5—Great Britain Search Report," UK Intellectual Property Office, Concept House, Newport, South Wales, UK, Apr. 3, 2008, 4 pages.

Sang Min Lee, "PCT/US2008/082548—PCT International Search Report and Written Opinion," WIPO, ISA/KR, Korean Intellectual Property Office, Daejeon, Republic of Korea, May 12, 2009, 11 pages, most relevant pp. 7-8 and 10-11.

\* cited by examiner

APPARATUS AND METHOD FOR EVENT DETECTION

FIELD OF THE INVENTION

The invention relates to an apparatus and method for event detection and in particular, but not exclusively, event detection suitable for a Global System for Mobile communication or a Universal Mobile Terminal System cellular communication system.

BACKGROUND OF THE INVENTION

Mobile communication and cellular communication systems have become an integral part of society and people's daily life. In order to further improve the provided communication experience, a number of additional communication services have over the years been introduced including for example data communication services which may e.g. be used for Internet access.

Furthermore, the ubiquitous nature of cellular communication systems have been exploited in some services which e.g. can evaluate the conditions of the cellular communication systems itself to derive information that may be of interest to the end users of the system. As an example, U. S. patent application US 2003/0100990 discloses a system wherein call loading and call activity is used to estimate a vehicular traffic flow for road traffic. The system evaluates the occupancy or loading of different cells in order to estimate the vehicular traffic flow on roadways connecting the cells.

However, although the number and variety of services that are introduced to cellular communication systems are increasing, there is a desire for additional and in particular added value services to be introduced and/or for additional services to be developed based on an evaluation of the operating characteristics of the cellular communication system.

SUMMARY OF THE INVENTION

Accordingly, the Invention seeks to preferably mitigate, alleviate or eliminate one or more of the above mentioned disadvantages singly or in any combination.

According to an aspect of the invention, there is provided an event detection apparatus for a cellular communication system supporting a plurality of remote stations, the apparatus comprising: means for receiving video upload activity indications, each video upload activity indication comprising an indication of a video upload from a remote station of the cellular communication system and a remote station location indication for the remote station; and generating means for generating an event indication in response to the video upload activity indications meeting a criterion, the event indication comprising an event location indication generated in response to the remote station location indications.

The invention may allow an additional and/or improved service for a cellular communication system. In particular, a new or improved event detection service may be provided. The invention may allow facilitated and/or improved implementation and/or operation.

The inventors have realised that evaluation of specific location information and video upload activity in a cellular communication system allows improved event detection since such activity provides a more accurate reflection of typical user behaviour in the presence of many types of events.

Specifically, the inventors have realised that typical user behaviour associated with uploading video (clips) is substantially different from user behaviour associated with other more typical uses of a cellular communication system, and in particular that video upload activity typically is associated with different user experiences than conventional communication services, and that accordingly an evaluation of video upload activity and associated location information may be used to provide automated and/or improved event detection.

The inventors have realised that a cellular communication system can provide detailed and individual video upload activity and location information that allows improved event detection, and in particular that analysing specific video upload characteristics, rather than e.g. cell loading, call traffic or call activity information, is particularly suitable for event detection and may provide substantially improved event detection performance.

The invention may for example evaluate video upload activity characteristics for a video clip sharing application, such as an Internet based application for public sharing of video clips. In many scenarios, a significant event may cause a large number of users in the vicinity of the event to capture a video clip using a cellular remote station and to upload the captured video clip to the video clip sharing application. Accordingly, the video upload activity may unexpectedly increase considerably in the proximity of the event thereby allowing such unusual activity to be detected and used to detect that an event has occurred.

The video upload communication is specifically a one way video communication. Thus, rather than evaluating two-way calls, the event detection may be based on a one-way video upload. The video uploads can thus be video uploads originating exclusively at the initiative of the user of the originating remote station(s), thereby providing improved event detection.

The cellular communication system may be any communication system comprising a plurality of base stations and/or access points covering different areas and wherein video may be uploaded to an access point or base station over an air interface. For example, the cellular communication system may e.g. be a UMTS and/or GSM cellular communication or may e.g. be a wireless network system, such as an IEEE 802.11 communication system or an IEEE 802.16 communication system.

According to another aspect of the invention there is provided a method of event detection for a cellular communication system supporting a plurality of remote stations, the method comprising: receiving video upload activity indications, each video upload activity indication comprising an indication of a video upload from a remote station of the cellular communication system and a remote station location indication for the remote station; and generating an event indication in response to the video upload activity indications meeting a criterion, the event indication comprising an event location indication generated in response to the remote station location indications.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to uploading of video clips in a GSM/UMTS cellular communication system. However, it will be appreciated that the invention is not limited to this application but may e.g. be applied to many other communication system.

Figure 1:
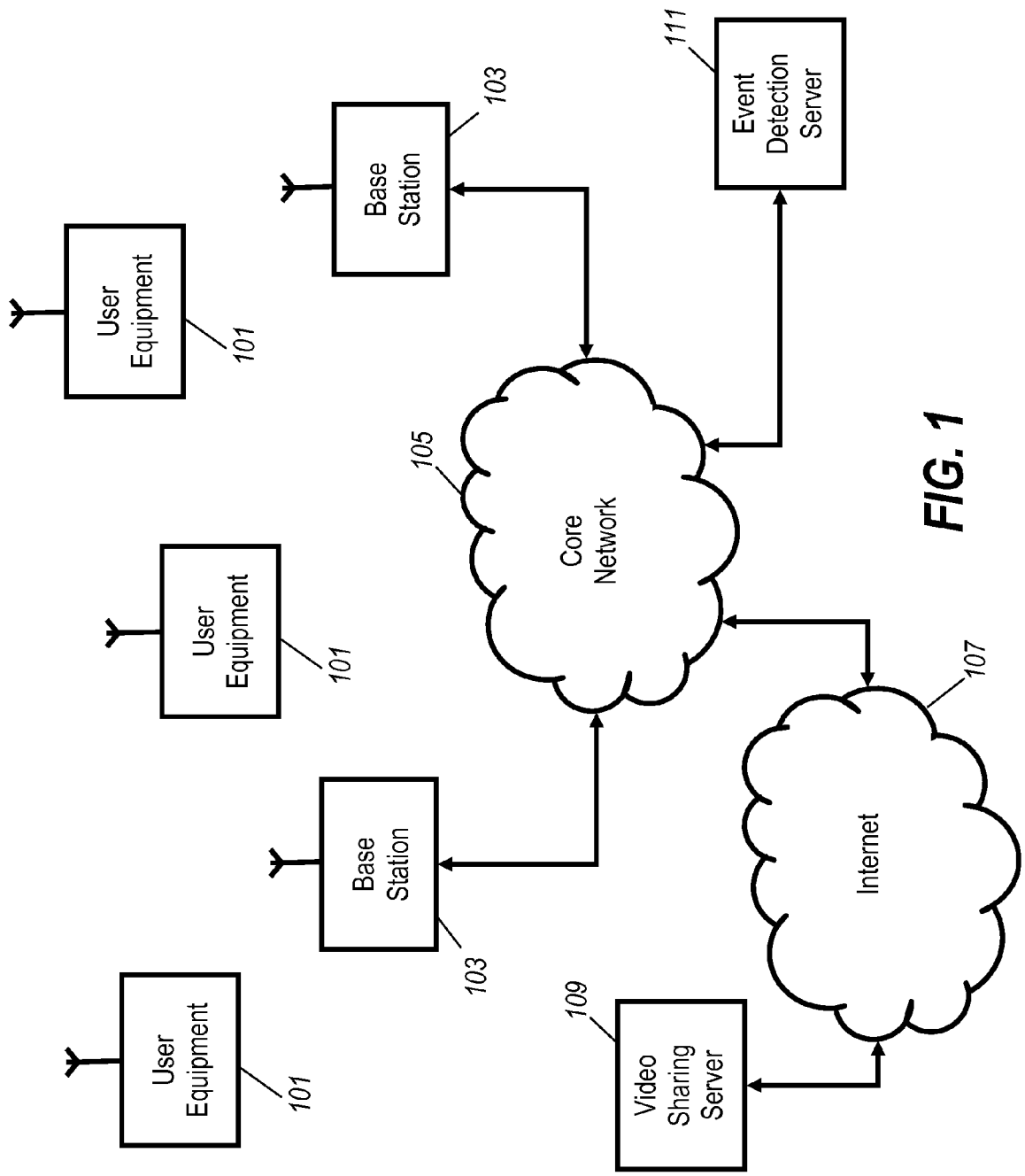
FIG. 1 is an illustration of an example of a cellular communication system in accordance with some embodiments of the invention.

FIG. 1 illustrates an example of a cellular communication system in accordance with some embodiments of the invention.

The cellular communication system is a GSM/UMTS cellular communication system which supports a plurality of remote stations. In the example three remote stations 101 supported by two base stations 103 are shown but it will be appreciated that a typical cellular communication system will support a large number of remote stations and base stations. A remote station may be any communication entity capable of communicating with a base station (or access point) over the air interface including e.g. a mobile phone, a mobile terminal, a mobile communication unit, a user equipment, a subscriber unit, a 3G User Equipment etc.

The base stations 103 are coupled to a GSM/UMTS core network 105 which represents all aspects of the fixed segment of the GSM/UMTS communication system including other base stations, Radio Network Controllers, Mobile Switching Centres etc as will be well known to the person skilled in the art.

In the example, the core network 105 is coupled to the Internet 107 through a suitable interworking function. The system furthermore comprises a video sharing server 109 which is coupled to the Internet 107. The video sharing server 109 provides a video sharing application allowing users to upload video clips which are then categorised and stored in the video sharing server 109. The video sharing application provides a web site that can be accessed by users and which allows them to select and be presented with specific video clips.

In the system, video clips may be uploaded to the video sharing server 109 from communication terminals, such as computers, coupled to the Internet 107. In addition, video clips may also be uploaded to the video sharing server 109 from remote stations 101. Typically, such video clips will also be generated by the remote stations 101 themselves e.g. using a built in video camera and will be transmitted from the remote station 101 to a serving base station over the air interface of the cellular communication system. The video clips may then be communicated from the serving base station 103 to the video sharing server 109 via the core network 105 and the Internet 107 thereby allowing the uploaded video to be included in the provided video sharing service.

The system of FIG. 1 furthermore comprises an event detection server 111 which is capable of detecting the occurrence of an event based on video upload characteristics of the cellular communication system. Specifically, the event detection server 111 can monitor video upload activities to the video sharing server 109 and can determine that an event has occurred in response to changes in such characteristics.

The described event detection approach exploits the current trend towards an increasing provision of de-centralised user-generated video content on the Internet, such as evidenced e.g. by the huge popularity of various video sharing services. Furthermore, as video services and video capture capable remote stations are becoming increasingly popular, the inventors have realised that such video content may increasingly be generated and uploaded from cellular remote stations. Furthermore, the inventors have realised that a cellular communication system can provide additional information in terms of the location of the remote stations which may reflect the location of the content of the video clip. Also, the inventors have realised that combining video upload activity information for e.g. video sharing services with the associated location information, an improved and more reliable event detection can be achieved. In particular, the inventors have realised that detecting events based on such information may provide a highly advantageous event detection as user behaviour associated with video upload activities (rather than e.g. two-way call activities) is closely correlated with the occurrence of many types of events.

For example, in locations where nothing particular is happening, a typical video upload activity will generally be present such as e.g. users uploading personal content for family and friends. However, when a shared event experienced by a wider number of users (unexpectedly) occurs, many of these users may decide to upload video clips of the event taken by the user's personal remote station. Indeed, as most people nowadays tend to carry a personal remote station, such as a mobile phone, many significant events of interest to a large group of people are likely to be recorded by the remote stations. Accordingly, when a suitable event occurs in a specific location, the video upload traffic will often increase substantially in that location. In the system, such an increase in video upload activity is detected by the event detection server 111 and is used to determine that an event has been detected. The location of the event may be determined from location information associated with the video uploads. For example, the event detection server 111 can use the information to define an event area where it is likely that something particular is happening.

Thus, the Inventors have realised that as cellular communication systems develop to provide improved support for video communication, it is increasingly likely that when an event happens in a particular location, a significant number of persons will record a video of the event using their mobile phones and immediately upload the resulting video clip to e.g. a video sharing application. Thus, the video network traffic in the area where the event is taking place will be higher than usual, and this anomaly in the network traffic can be detected and used to infer that something may be happening in that area.

Figure 2:
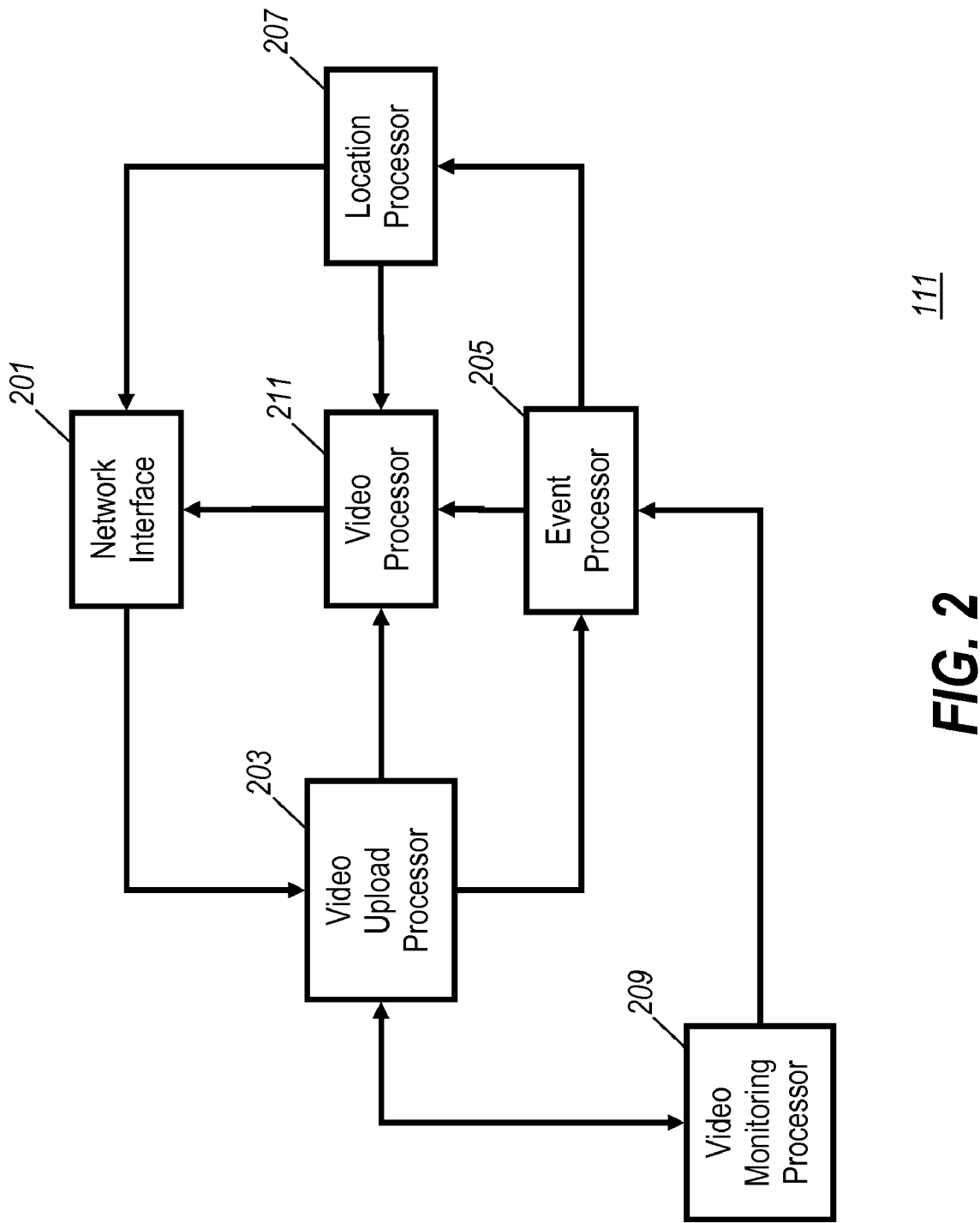
FIG. 2 is an illustration of an example of an event detection server 111 in accordance with some embodiments of the invention.

FIG. 2 illustrates elements of the event detection server 111. In the example, the event detection server 111 is illustrated as a separate network element coupled to the core network 105 of the cellular communication system. However, it will be appreciated that in other embodiments the event detection server 111 may be located elsewhere and/or the functionality described with reference to the event detection server 111 may be located in a number of different network elements. For example the event detection server 111 may be an integral part of a core network element or may for example be implemented in the video sharing server 109 itself. It should be appreciated that the event detection server 111 may be implemented as a plurality of individual event detection servers or equivalently that a system may comprise a plurality of separate event detection servers. For example, a number of event detection servers may be deployed with each event detection server covering a different geographical area.

The event detection server 111 comprises a network interface 201 which is operable to interface the event detection server 111 to the core network 105. The network interface 201 receives video upload activity indications from the core network 105.

Each video upload activity indication comprises an indication of video upload from a remote station 101 as well as a remote station location indication for the remote station. Thus, whenever an uploading of a video clip from a remote station 101 is initiated this is detected by the system and an indication thereof is transmitted to the event detection server 111. Accordingly, the event detection server 111 not only receives indications of new video uploads being initiated but also receives information indicative of the location from where the video uploads are coming.

The video upload activity indications are specifically indicative of a remote station originated upload of a video clip. The video upload is specifically a one way communication and no video is downloaded to the remote station 101. Furthermore, the video upload is specifically an unsolicited video upload and is not uploaded in response to any request or instruction from the cellular communication system or any other network element, server or entity. Rather, the video upload is typically in response to a manual user input instruction the remote station 101 to perform the video upload. Thus, the video upload is instigated because the user of the corresponding remote station 101 considers the recorded video footage to be of interest to one or more other users. In the example, the video upload is intended for an anonymous user. Thus, the originating remote station 101 does not direct the video upload to any specific user or to any application associated with one or more specific users. Rather, in the example, the video uploads are to a video application which provides a passive video storage means from which other users may request and select specific video clips.

The location indication may for example be a coarse network generated location indication, such as a simple indication of which cell the video upload was performed. In other embodiments more accurate location indications may alternatively or additionally be provided, such as an accurate network or remote station generated location estimate based on triangulation between different base stations or an location estimate generated by a GPS receiver of the remote station itself.

In some embodiments, video upload indications may be provided for all video uploads e.g. within a given area. However, in other embodiments or scenarios video upload indications may only be generated for a subset of video uploads. For example, in some embodiments only video uploads meeting a given characteristic may be considered, such as only uploads of video clips that are shorter than a given duration. As another example, in some embodiments only video uploads addressed to specific destinations are considered, such as for example only video uploads to specified video sharing applications.

In the example, each video upload (within a given region) from a remote station 101 causes a video upload activity indication to be generated by a core network element and transmitted to the event detection server 111. E.g. when a Radio Network Controller (RNC) detects a video upload, it also generates a video upload activity indication and transmits this to the event detection server 111. As another example, at regular intervals a core network element may transmit information to the event detection server 111 indicating how many video uploads have been initiated since the last report.

It will also be appreciated, that in some embodiments where the event detection server 111 is fully or partially implemented as part of a core network element, the video upload activity indications may be available and/or generated within this core network element itself. Also, in many embodiments the video upload activity indications may be represented by statistical video traffic data generated e.g. by the core network 105.

It will also be appreciated that in some embodiments the generation and initial processing of video upload activity indications for individual video uploads may occur in individual network elements before information is transmitted to the event detection server 111. For example, when a new video upload is initiated, the serving RNC may detect this and register the associated location. However, rather than transmitting this individual upload activity indication to the event detection server 111, the RNC may collate the data from all video uploads initiated within a time interval and may merely transmit data reflecting the combined video upload activity, such as a number of video uploads within a given geographical area. For example, the RNC may at regular intervals transmit information to the event detection server 111 reporting how many video uploads have occurred in each individual cell served by the RNC since the last report was transmitted.

For clarity and simplicity, the following description focuses on an embodiment wherein the event detection server 111 receives a single video upload activity indication for each initiated video upload. However, as previously mentioned, in other embodiments the event detection server 111 may be considered to be distributed over a plurality of network elements such that the initial detection and processing of individual video uploads may be performed in network elements of the core network.

It will also be appreciated that the approach and principles of the described embodiment can readily be extended to an example where the event detection server 111 is coupled to the Internet 107 rather than to the core network 105. Specifically, the functionality described with reference to the event detection server 111 can be implemented in the video sharing server 109 itself. In such a case, each upload of a video with an associated location indication to the video sharing server 109 can itself be considered a video upload activity indication.

The network interface 201 is coupled to a video upload processor 203 which is fed the received video upload activity indications. The video upload processor 203 extracts the video upload activity data from the received messages and feeds them to an event processor 205 to which the video upload processor 203 is coupled.

The event processor 205 proceeds to determine whether the received video upload activity indications meet a given criterion. If the criterion is met, the event processor 205 determines that a new event has occurred and accordingly it generates an event indication.

The event processor 205 is coupled to a location processor 207 which in response to the event detection by the event processor 205 proceeds to generate a location estimate for the event. Specifically, based on the received location information for the video uploads, the location processor 207 proceeds to generate an event location indication.

In the example, the location processor 207 is furthermore coupled to the network interface 201 and is arranged to generate an event detection message and transmit this to a remote destination via the network interface 201. For example, the location processor 207 can generate an event message indicating the estimated location of the event and transmit this to the video sharing server 109. The video sharing server 109 can then proceed to use the information from this message to process the uploaded video clips. For example, a new category may be generated comprising video clips received within a given time interval from the specified event location. Thus, a new event video category for the video sharing service may automatically and dynamically be generated.

It will be appreciated that different criteria for determining whether an event has occurred may be used in different embodiments.

In the specific example, the event detection criterion comprises a requirement that a given number of video upload activity indications meet a first qualifying criterion. The first qualifying criterion can specify a number of parameters of the video uploads that are of relevance. Thus, if enough qualifying video uploads are detected (i.e. that meet the qualifying criterion), it is considered likely that an event has occurred and accordingly an event detection indication is generated.

The first qualifying criterion may for example require that the number of video uploads within a given geographical area exceeds a given number. The geographical area can be defined relative to the locations of the video uploads. Specifically, the first qualifying criterion can comprise a requirement that the remote station locations for the video uploads are within a given distance of each other or can comprise a requirement that the video uploads are all within the same area and specifically are all in the same cell. Thus, in a simple example where no other requirements are included in the first qualifying criterion, the event detection criterion may simply correspond to a requirement that the number of video uploads within a given distance of each other or within the same cell is above a given threshold. Accordingly, if an unusually high number of video uploads occur in a small geographical area, it is likely that this is due to an event happening and therefore an event detection indication is generated by the event processor 205.

Thus, the event processor 205 can simply determine whether a current video upload activity level for a geographic area exceeds a threshold. Specifically, the event detection criterion can comprise a requirement that more than a given number of video upload activity indications are received that are indicative of video uploads initiated within a given time interval and at locations that meet a geographic criterion. Hence, an event may be considered to be detected if the received video upload activity indications in a given time interval includes more than a given number of activities from one or more specified geographic areas (possibly in addition to other requirements).

For example, the event processor 205 may at regular intervals, such as every five minutes, evaluate the video upload activity indications received in the previous interval. In a simple embodiment, it may simply determine how many video upload indications have been received in each cell and determine that an event has occurred in a cell for which there is an unusually high number of video uploads, e.g. if more than a given threshold of video upload indications are received in the cell.

In some embodiments, the geographic area is not a static predetermined geographic area, such as a cell, but is dynamically determined by the remote station location indications of the video upload activity indications.

As a simple example, the geographic area may be defined as any circular area having a given diameter. Accordingly, the event processor 205 may generate an event detection if more than a given number of video uploads occur within a given distance of each other, or equivalently if an area in which a given number of video uploads occur is smaller than a given threshold.

As a more complex example, the event processor 205 may first cluster the received video upload activity indications depending on the location indications. This clustering algorithm may dynamically and automatically divide the received video upload activity indications into clusters of indications that are close to each other without requiring any predetermined location areas to be defined. As a consequence of such clustering, a large number of video uploads occurring in a relatively small region will automatically be clustered together independently of how this region aligns with e.g. the cell borders of the system. Also, the cluster sizes can be indicative of the amount of video uploads occurring in the different geographic areas.

It will be appreciated that different clustering algorithms will be known to the person skilled in the art and will for brevity not be described further herein. Following the clustering process, the event processor 205 can proceed to evaluate the resulting cluster sizes. If the cluster sizes are relatively homogenous, it is likely that only normal (non-event) user video upload activity is occurring in the system and thus that no specific dramatic event has occurred. However, if one cluster contains many more elements than all other clusters (reflecting that a very high number of video uploads have occurred in a small region) it is likely (or at least possible) that this is due to a dramatic event occurring in that region and accordingly the event processor 205 determines that an event has occurred. It will be appreciated that the evaluation of the cluster sizes and the associated event detection may further consider typical average cluster sizes expected to occur for the given area considered. For example, the clustering output may be compared to previous cluster outputs for times when it is known that no specific event occurred. If the cluster outputs deviate significantly, an event indication may be generated.

In some embodiments, the first qualifying criterion can additionally or alternatively include a requirement that the video upload communication is addressed to a given destination. Thus, only video uploads that are addressed to the specific destination are included when determining if the threshold is exceeded.

In the example, the destination may specifically be a destination of a video sharing application such that only video uploads to this video sharing application are considered when detecting an event. This provides a substantially more accurate event detection as the operational characteristic of the cellular communication system which is used to detect the event is directly related to data traffic that is frequently very closely related to events occurring. For example, the approach allows an automatic exclusion of e.g. video greeting messages sent to other users, two way video communications etc. In particular, the approach allows event detection based on video uploads that are considered by the originating user to be of interest to the public in general rather than to specific individuals known to the originator.

In the specific example, the qualifying criterion can specifically include a requirement that the video upload must be addressed to the video sharing server 109 in order to be considered when determining whether an event has occurred. The event processor 205 can accordingly detect whether an Internet destination address for the video upload corresponds to the Internet address of the video sharing server 109.

It will be appreciated, that in some embodiments the destination included in the first qualifying criterion may be a set of destinations, for example including addresses of a number of different video sharing applications or multiple addresses for the same video sharing application.

It will also be appreciated, that in embodiments wherein the event detection server 111 is part of the video sharing server 109, the requirement that only video uploads to the video sharing service are considered may inherently be met as only video activities associated with uploading video to the video sharing server is known by the event detection server 111.

In many embodiments, the event detection criterion will be dependent on a previous or a measured traffic condition for the cellular communication system. Thus, the event detection may be based on detecting an anomaly or unusual pattern in the video upload activity of the system.

In the system of FIG. 1, the event detection server 111 comprises a video monitoring processor 209 which continually evaluates the received video upload activity indications and determines average or typical video upload characteristics for time intervals in which no event is detected by the event processor 205. The video monitoring processor 209 is coupled to the video upload processor 203 and the event processor 205. It receives the video upload activity indications from the video upload processor 203 and can then on request provide a measured video upload traffic indication to the event processor 205. This indication is then used by the event processor 205 to modify the event detection criterion.

As a simple example, the typical or average video upload activity in each cell as a function of the time of day and day of week may be measured and stored in the event detection server 111. At regular intervals, the event processor 205 may accordingly compare the video upload activity for each cell to the average video upload activity for the same time of day and day of week. If a significant discrepancy is detected, the event processor 205 proceeds to determine that an event has been detected.

The location processor 207 may use any suitable approach or algorithm for determining the event location. Specifically, the location processor 207 can determine the event location in response to the location indications of the video upload activity indications that meet a geographic requirement of the criterion. Thus, if the event detection criterion comprises a qualifying geographic requirement, the event location is determined on the basis of the video uploads that meet this requirement, i.e. it is based on the video uploads that resulted in the event detection.

For example, if simple cell-based event detection is used, the event location indications can simply be generated as the location of the cell that resulted in the event detection. As another example, if the distance requirement is used by the event detection criterion (e.g. requiring that more than a given number of video uploads must occur within a given distance of each other), the event location can be generated from the locations associated with the video uploads that meet this requirement. As another example, if the clustering approach is used, the event location can be generated from the location estimates of the video uploads that are included in the cluster that caused the event detection.

The event location may for example be generated as a single location, such as the location of a base station serving a cell in which the event has been detected. As another example, a single location may be determined as an average location or a combined minimum distance location for the location estimates of the video uploads that caused the event detection.

However, in other embodiments the event location may not be determined as a single location but rather as an event area. For example, the event area may be set to include an area that includes all location estimates for the video uploads that resulted in the event detection. E.g., the event area may be set as the cell coverage area for a cell activity detection criterion or as the area formed by the location estimates of a cluster resulting in the event detection for a clustering approach.

A determination of an event area may provide advantages in many embodiments. For example, it may allow future processing of video uploads to be treated differently depending on whether they originate within the determined event area or not. For example, future video clips uploaded to the video sharing server 109 within the specified event area may be immediately added to the newly formed event category.

In some embodiments, an event area may be defined relatively broadly, such as one or more cells in which the video upload activity is unusually high. However, the location processor 207 may additionally determine one or more hotspot areas within the event area thereby reflecting hot spot areas where video upload traffic is even higher than in the rest of the event area. This may allow a detection of e.g. areas that are particularly close to the centre of the detected event or are associated with a particularly advantageous point of view thereby resulting in more video recording and uploading.

In some embodiments, the uploaded video clips may furthermore be processed in response to the event detection and the determined event location. In the specific example of FIG. 2, the event detection server 111 furthermore comprises a video processor 211 that is coupled to the event processor 205, the video upload processor 203 and the location processor 207.

In some embodiments, the video processor 211 is arranged to select a subset of video upload clips from a set of video upload clips associated with video upload activity indications meeting a geographic requirement relative to the event location indication.

For example, the video processor 211 may receive a signal from the event processor 205 indicating that an event has been detected. It may furthermore receive the estimated event location from the location processor 207 and may then proceed to filter the video upload activity indications received from the video upload processor 203.

E.g. the video processor 211 may first proceed to identify all video upload activity indications that meet a given geographic requirement, such as e.g. a requirement that they are within a given distance of the determined event location. The applied geographic requirement may be the same as used when detecting the event and thus the video processor 211 may identify the video upload activity indications that are associated with the geographic restriction used to determine if an event has occurred. However, it will be appreciated that in other embodiments, other requirements may be used.

For example, all video upload activity indications belonging to a cell and/or cluster that resulted in the event detection may be selected. This initial step can isolate all video upload activity indications that are considered to be related to the detected event. The video processor 211 can then proceed to select one or more of these video upload activity indications thereby selecting a subset of associated video clips.

The subset of video clips may then be processed further either by manual or automatic means. For example, the selected subset of video clips may be presented to a user or service operator which can manually generate and enter suitable event description data characterising the event based on the presented video clips. Thus, even for situations where e.g. several hundreds of video clips are received for a given event, the event detection server 111 may automatically select a few video clips representing the whole group of event related video clips. Only the selected video clips may be presented to the user/operator thereby substantially facilitating the task of characterising the event.

Thus, following the detection of an event area, the video clips uploaded by the users in the event area can be analyzed (automatically and/or by a human operator) to determine what the event actually is. Based on this content analysis, the video clips may be processed differently and/or the event may be characterised.

The video processor 211 allows the execution of a strong pre-filtering algorithm thereby facilitating the analysis of the content. For example, for many events it will be sufficient to only analyze a small number of video clips from the event area in order to determine if an event is actually taking place and if so which kind of event is taking place.

In some embodiments, the selection of video upload clips for the subset is dependent on the location indication associated with each video upload clip (and comprised in the associated video upload activity indication).

For example, in some embodiments a well-defined single location point may be identified for the event by the location processor 207. The video processor 211 may then select a predetermined number of video clips as the predetermined number of video clips that are closest to this location point. As another example, if a large event area has been identified, the video processor 211 may select video clips that correspond to different locations within the event area. For example, the video processor 211 may select video clips for the subset such that these represent a relatively uniform distribution of points across the identified location area. This may in many scenarios provide a better coverage of the event such as e.g. ensure that the event is covered from different angles and/or that different aspects of the event are covered. As yet another example, the selection of the subset of video clips may depend on the distribution of video uploads within the selected event area. For example, if hotspot areas are detected within the event area, the video processor 211 may selects a higher number of video clips from such hotspot areas as these may typically correspond to locations of particular interest or beneficial viewpoints.

In some embodiments, the video processor 211 may alternatively or additionally group together video upload clips associated with video upload activity indications that meet a geographic requirement relative to the event location indication.

For example, all video upload clips for which the video upload activity indication has a remote station location indication that falls within a given distance of a specified event location point or within a determined event area may be grouped together. Thus, a group of video upload clips can be generated which are considered to be highly likely to be related to the detected event. The group of video upload clips may then be processed, manipulated or treated based on this assumption and in particular the video clips of the group may be treated together.

As an example where the event detection server 111 is part of the video sharing server 109, the video upload clips may automatically be grouped together and presented to users as one video sharing category. Thus, if a new and significant event occurs, the video sharing service may automatically (or semi-automatically) generate a new category for video clips (assumed to be) associated with this event. E.g. for web-based video sharing application, the homepage may automatically be amended to include a new category corresponding to a detected event. Furthermore, one or more uploaded video clips from the selected subset may be presented on the homepage thereby allowing the users of the service to easily determine whether the video clips associated with the event are of any interest. Furthermore, an operator of the video sharing service can, based on the subset of video upload clips, provide characterising text with very little effort.

In example of FIG. 1 where the event detection server 111 is remote from the video sharing server 109, the video processor 211 may e.g. transmit messages via the network interface 201 to the video sharing server 109 identifying the video upload clips that are associated with the detected event. Alternatively or additionally, the video processor 211 may transmit messages comprising characterising data and/or category information for the selected video clips. The video sharing server 109 may then categorise, describe and/or present the video upload clips in response to this data.

It will be appreciated that in many embodiments wherein the event detection server 111 is remote from the video sharing server 109, the event detection server 111 need not have access to the actual video upload clips but can perform the evaluation, categorisation and subset selection based on video upload activity indications that do not in themselves comprise any video content.

In the example, the event detection server 111 may be considered part of the cellular communication system. However, as previously mentioned, the event detection server 111 may in other embodiments be independent of the cellular communication system and may for example be operated by a third party rather than an operator of the cellular communication system.

Indeed, as previously mentioned, the event detection server 111 may be part of the video sharing server 109 and may be connected to the cellular communication system via an Internet connection. Indeed, the only connection between the event detection server 111 and the cellular communication system may be via the Internet.

In such an embodiment, the video sharing server 109 may receive the actual video upload clips and associated location information. This data may be considered to correspond to the previously described video upload activity indications.

In some such embodiments, the remote station location indications can be comprised in the video upload clips themselves. Thus, the video upload clips may directly correspond to the previously described video upload activity indications.

If the event detection server 111 is part of the video sharing server 109, the video upload processor 203 can specifically comprise functionality for retrieving or extracting the remote station location indication from the video upload clips. The event detection may then proceed as previously described.

For example, in some embodiments, each of the remote stations 101 may comprise a GPS receiver which provides a location estimate for the remote station 101. When a video clip is uploaded, the remote station 101 automatically inserts the current GPS location estimate in the video upload clip, for example by introducing it to a predetermined auxiliary data field of the generated video data stream. Thus when the video sharing server 109 receives a video upload clip (being treated as a video upload activity indication), the embedded GPS location estimate is extracted and used for the event detection as previously described. Such an embodiment may be advantageous in many scenarios as it can be implemented without any other requirements to the cellular communication system than the remote stations 101 being capable of embedding a location indication in the uploaded video clips. Thus, the described functionality can be achieved without requiring any modifications or changes to an existing cellular infrastructure.

The described system provides an approach wherein real-time events that cause remote station users to create and share additional multimedia content to be detected by a detection of an anomaly compared to a previous or average uploaded multimedia content traffic. The anomaly is detected on the basis of video upload traffic information and associated location information.

Thus, the system may allow a novel use of the additional capabilities and services offered by improvements of cellular communication systems while specifically exploiting correlations between typical user behaviour and specific traffic effects in the cellular communication system. The approach may accordingly provide improved event detection.

Figure 3:
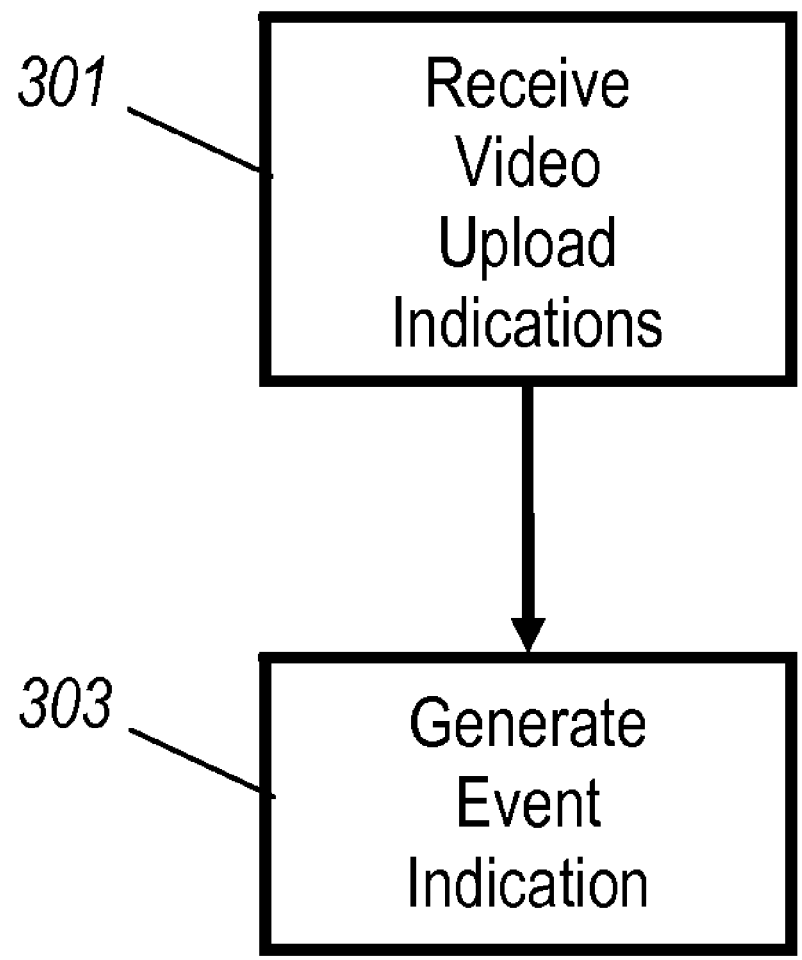
FIG. 3 is an illustration of an example of a flowchart for a method of event detection in accordance with some embodiments of the invention.

FIG. 3 illustrates a method of event detection for a cellular communication system in accordance with some embodiments of the invention.

The method starts in step 301 wherein video upload activity indications are received. Each video upload activity indication comprises an indication of an active video upload communication from a remote station of the cellular communication system and a remote station location indication for the remote station.

Step 301 is followed by step 303 wherein an event indication is generated in response to the video upload activity indications meeting a criterion. The event indication comprising an event location indication generated in response to the remote station location indications.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An event detection apparatus for a cellular communication system supporting a plurality of remote stations, the apparatus comprising:
   means for receiving unsolicited video upload activity indications on an event detection server that is coupled and interfaced with a core network, each video upload activity indication comprising an indication of a video upload from a remote station of the cellular communication system and a remote station location indication for the remote station; and
   generating means for generating an event indication in response to the video upload activity indications meeting a predetermined criterion, wherein the criterion enables detection that a shared event has occurred as a result of detecting that video network traffic on the cellular communication system is higher than usual and the event indication comprising an event location indication generated in response to the remote station location indications.

2. The event detection apparatus of claim 1 wherein the criterion comprises a first requirement that a given number of video upload activity indications meet a first qualifying criterion.

3. The event detection apparatus of claim 2 wherein the first qualifying criterion comprises a requirement that the video upload communication is addressed to a given destination.

4. The event detection apparatus of claim 3 wherein the given destination is a destination address for a video sharing application.

5. The event detection apparatus of claim 3 wherein the given destination is an Internet address.

6. The event detection apparatus of claim 1 further comprising means for determining the criterion in response to a previous traffic condition for the cellular communication system.

7. The event detection apparatus of claim 1 further comprising means for determining a current video upload activity level for a geographic area in response to the video upload activity indications; and wherein the criterion comprises a requirement that the current video upload activity level exceeds a threshold.

8. The event detection apparatus of claim 7 further comprising means for determining the threshold in response to a previous video upload activity level for the geographic area.

9. The event detection apparatus of claim 7 further comprising means for determining the geographic area in response to remote station location indications of the video upload activity indications.

10. A method of event detection for a cellular communication system supporting a plurality of remote stations, the method comprising:
    receiving unsolicited video upload activity indications on an event detection server that is coupled and interfaced with a core network, each video upload activity indication comprising an indication of a video upload from a remote station of the cellular communication system and a remote station location indication for the remote station; and
    generating an event indication in response to the video upload activity indications meeting a predetermined criterion, wherein the criterion enables detection that a shared event has occurred as a result of detecting that video network traffic on the cellular communication system is higher than usual and the event indication comprising an event location indication generated in response to the remote station location indications.

\* \* \* \* \*